March 1, 1938.   W. A. RINGLER   2,109,504
PACKAGE AND WRAPPER THEREFOR
Filed Sept. 19, 1934   2 Sheets-Sheet 1
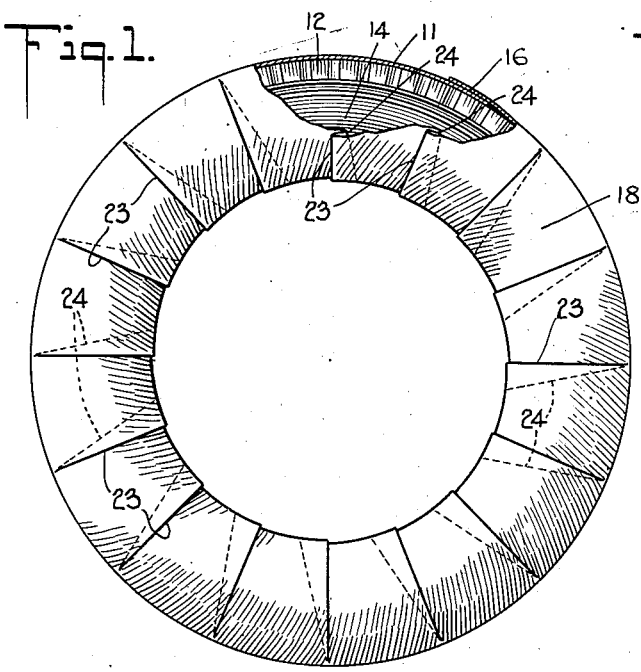
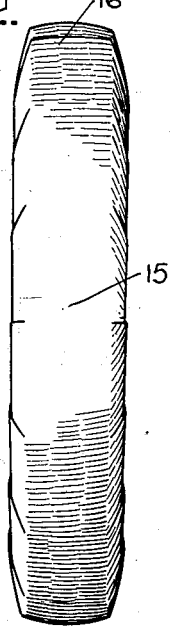
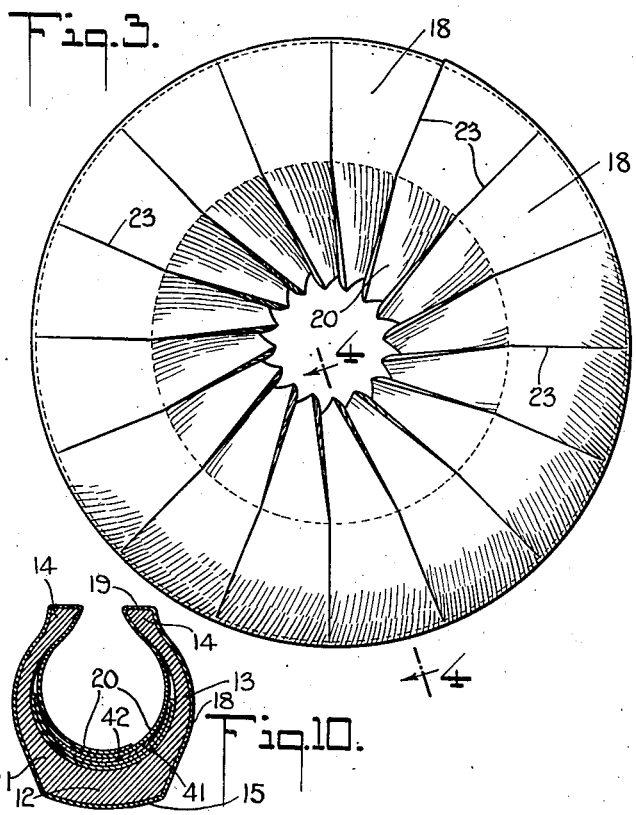
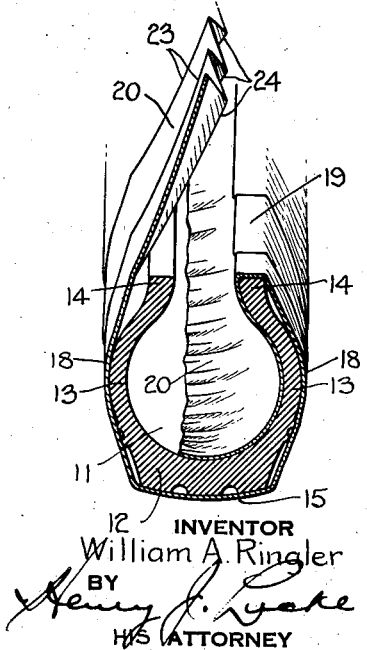
INVENTOR
William A. Ringler
BY
HIS ATTORNEY March 1, 1938. W. A. RINGLER 2,109,504
PACKAGE AND WRAPPER THEREFOR
Filed Sept. 19, 1934 2 Sheets-Sheet 2
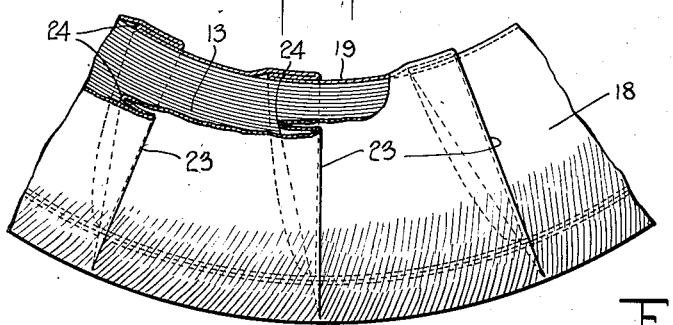
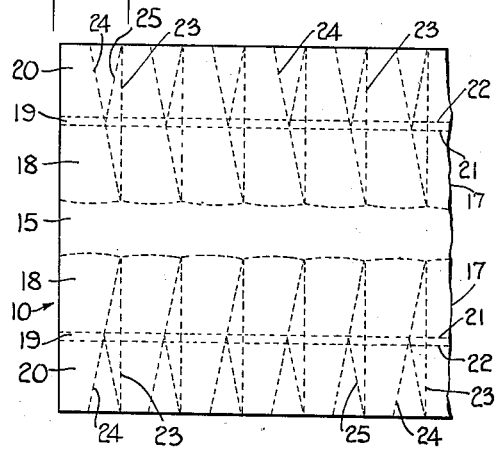
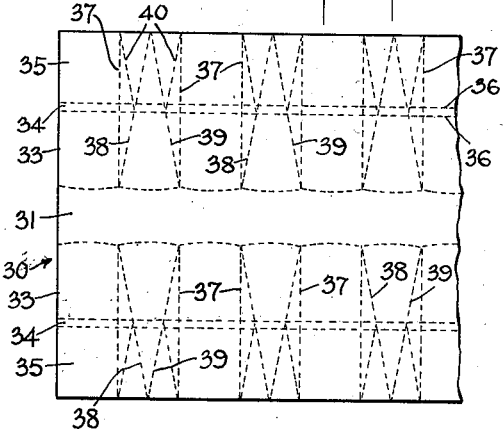
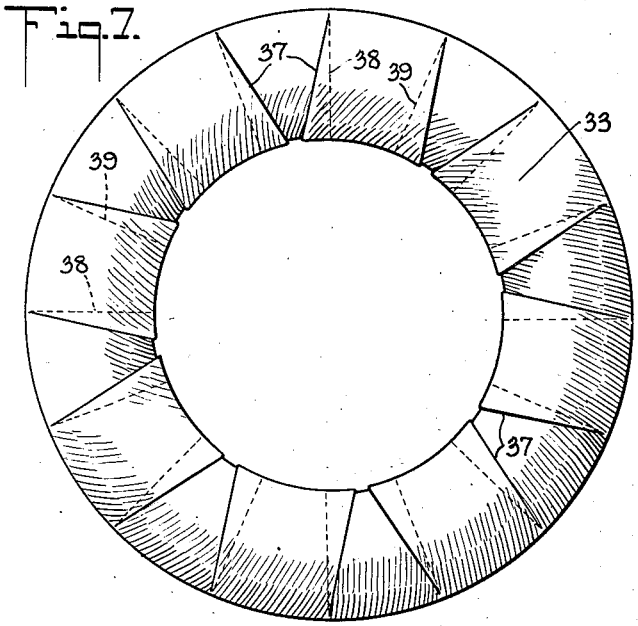
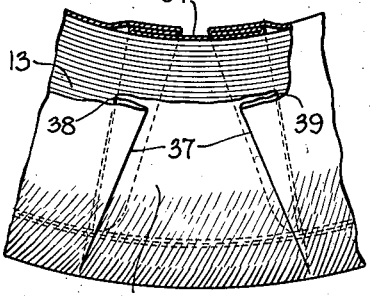
INVENTOR
William A. Ringler
BY
HIS ATTORNEY Patented Mar. 1, 1938

2,109,504

UNITED STATES PATENT OFFICE 2,109,504

PACKAGE AND WRAPPER THEREFOR

William A. Ringler, Wayne, Pa., assignor to Walton D. Lynch, New York, N. Y.

Application September 19, 1934, Serial No. 744,643

2 Claims. (Cl. 206—46)

My invention relates to packages, and more particularly to an improved package, to an improved covering for packages, and to the improved method of applying such covering.

My invention is particularly applicable to articles made of distortable material having an inner and outer diameter, the outer diameter being the greater, as in articles having a toroidal form, particularly tire shoes or casings.

Prior to the shipment of tire casings from the factory, the same are enveloped in a covering of wrapping material. This is done for a plurality of reasons, such as the protection of the tire casing from injury, the maintaining of the tire casing in new or "fresh" condition, and the labelling of the different sizes and grades of tire casings in order that they may be readily identified. Because of the toroidal shape and distortable qualities of a tire casing, and because of the considerable total displacement thereof, it has been found difficult to satisfactorily and cheaply envelope the same in a wrapping material possessed of the requisite rigidity and wear resisting qualities, and in a form that will successfully resist the severe shocks to which the same are subjected before reaching the ultimate consumer.

It has heretofore been proposed to use as an enveloping material a soft paper, such as crepe paper, but the very nature of this paper renders it susceptible to deformation and injury, and in the main, has been found unsatisfactory. The form of the wrapper has been varied from time to time, until at present the accepted form is the so-called "wrap around" where a relatively narrow strip of paper is helically wound around the substantially circular cross section of the tire casing. A "wrap around" envelope of crepe paper is subject to all the objections pointed out above, and has been found to be unsatisfactory. A "wrap around" envelope of a sufficiently durable material, such as a manila paper, avoids the objections to the distortion above pointed out, but the resulting package is subject to a serious fault. Further, the necessary and continuous overlap of the strip of paper employed as a wrapping uses more material than is necessary, adding to the weight and cost of the resulting package without commensurate advantages. Because of the character of the material of the enveloping material, it is inelastic and inextensible, and consequently, when subjected to shock, as by dropping the tire casing from a height, or suddenly deforming the tire casing, the enveloping material splits and is destroyed. In spite of these defects the "wrap around" envelope of manila or like papers appears to have become standard in the tire trade.

In my present invention, I have overcome the defects in prior wrapping devices, and have produced an enveloping wrapper for tire casings and the like in which all of the advantages of both crepe and manila paper are embodied, and in which, because of the form of the envelope, none of the defects of prior devices are present.

In carrying out my invention, I utilize a strip or band of a strong, relatively smooth, flexible material, such as manila paper, or a composite paper comprised of a layer of paper on one face of which is spread a layer of waterproofing material, such as asphaltum, the exposed face of the asphaltum being covered with an open netlike material, the strip extending about the outer periphery of the tire casing and lying smoothly in engagement therewith without distortion. The strip of enveloping material is wide enough to fold over and protect the side walls of the tire casing and to infold into the interior thereof sufficiently to protect said interior and any article that may be placed therein, as a tube and/or a tube protecting strip. To conform the lateral portions of the encircling and enveloping strip of paper to the contour of the side walls of the tire casing and to infold or tuck the edges of such lateral portions to a position within the tire casing, I fold or pleat the material thereof on radial or substantially radial lines, with respect to the tire casing and transverse to the length of the strip. Such folding or pleating not only similates, on the side walls of the tire casing, the appearance of present day tire enclosing envelopes, but actually stiffens or reinforces the envelope in its entirety, as well as causing the paper to conform closely to the rounded contour of the tire casing from the tread to the bead portion thereof.

The folding or pleating, while the same may be performed manually, is preferably done automatically by machinery. Such machinery preferably cuts off a strip of appropriate length from a roll of paper, applies the same to a tire casing, and folds and/or pleats the paper simultaneously with the application of the strip to the tire casing.

The absence of the enveloping material across the inner diameter of the tire casing, or from one bead portion to the other, removes the possibility of a breaking strain being placed on the enveloping material, and thus removes the most frequent cause of rupture of such material. I am aware that it has been proposed to infold crepe paper enveloping material to a point within the tire casing, but the nature of such paper precludes its remaining in set position. But in no instance of which I am aware has it been found practical to utilize a stiff manila, kraft, composite board, or similar paper in this situation.

The principal object of my invention therefore, is an improved covering for packages.

Another object of my invention is an improved package.

Another object of my invention is an improved covering wrapper for tire casings and the like, in the form of stiff sheet material partially enclosing a tire casing.

Still another object of my invention is an improved covering wrapper for tire casings having the form of an encircling band of stiff material having the lateral edges housed within the interior of the casing.

A further object is an improved method of applying an enclosing envelope to tire casings.

Other objects and novel features of the construction and arrangement of parts comprising the wrapper and the methods of applying the same will appear as the description of the invention progresses.

In the accompanying drawings:

Fig. 1 is a front elevation, partly in section, of a wrapping according to my present invention in position on a tire casing;

Fig. 2 is a side elevation of Fig. 1;

Fig. 3 is a side elevation, similar to Fig. 1, but with one of the lateral edges of the wrapper not yet "tucked" into the interior of the tire casing;

Fig. 4 is a section on the line 4—4 of Fig. 3;

Fig. 5 is an elevation of a fragment of my improved wrapper, parts being broken away to clearly illustrate the method of folding the lateral portions to conform to the rounded contour of the side wall of a tire casing;

Fig. 6 is a plan view of a portion of a strip of material from which my improved wrapper is made, and illustrating the method of folding the lateral portions thereof;

Fig. 7 is a view, similar to Fig. 1, and showing a modification of my invention;

Fig. 8 is a view, similar to Fig. 5, of the modification shown in Fig. 7;

Fig. 9 is a view, similar to Fig. 5, and applicable to the form of my invention illustrated in Fig. 7, and Fig. 10 is a sectional view of a tire casing wrapped according to my invention, and showing a tube and protecting strip enclosed within the casing.

Referring to the drawings, 10 designates a strip of wrapping material, of smooth, flexible and substantially inextensible sheet material, such as manila paper, kraft paper, composite board, or other like suitable material, of any suitable width and preferably of indeterminate length. When of indeterminate length the strip may be conveniently furnished in rolls, large or small, as desired, and cut off in lengths equal to the circumference of the tire casing to be wrapped, or enough longer to provide for a sufficient overlap. If preferred the strips may have their ends joined prior to the folding and pleating operation. The form in which the strip of wrapping material is furnished therefore, is immaterial as far as concerns the novelty of my invention, and in the subsequent description of my invention it will be assumed that the strip 10 of wrapping material is of indeterminate length.

The reference numeral 11 designates in its entirety a distortable article of toroidal shape, such as a tire casing of the usual straight sided type having a tread portion 12, the sides 13, and the beads 14, the tread 12 defining the outer diameter of an annulus, and the beads 14 the inner diameter.

The strip 10 of wrapping material is wrapped around the circumference of the tire casing 11, the medial longitudinal portion 15 of the strip engaging with the tread 12 and lying smoothly thereon. The ends of the strip 10 overlap, as at 16, and the overlapping ends are secured together, preferably by suitable adhesive. The lateral portions 17 of the strip 10 are divided into three zones 18, 19 and 20, the zone 19 being defined by the parallelly arranged dash lines 21, 22. The lateral portions 17 are provided with parallelly spaced dash lines 23 perpendicular to the length of the strip 10. Also the lateral portions 17 are provided with parallelly spaced dash lines 24 extending at an angle to the length of the strip 10. The dash lines 23 and 24 are arranged in pairs, as shown in Fig. 6, and the lines of each pair meet at the edge of the medial longitudinal portion 15 of the strip 10. The dash lines 23 and 24 form lines of fold for the lateral portions 17 of the strip 10, the dash line 23 designating an outside fold, and the dash line 24 designating an inside fold, as will be obvious from an inspection of Figs. 1, 3, and 5.

The strip 10 has been described as having the dash line 21, 22, 23, 24 etc. on its surface, but such need not be, and preferably is not, actually the case. The various lines designate lines of folding or pleating, and the actual folding or pleating make lines or creases in the body of the strip 10. In the completed enveloping wrapper, when a tire casing is actually enveloped therein, such lines or creases are quite apparent. The dash lines referred to therefore, may be considered as being referred to as a matter of convenience to more clearly set forth applicant's invention.

In addition to the dash lines above referred to, there is shown, in Fig. 6, other dash lines 25 running from an end of the dash lines 23 to a point intermediate the ends of the dash lines 24. This designates the line of fold or crease taken by the material of the outer edge of the zone 20 when such zone is inserted within the tire casing 11 between the beads 14.

As stated above, the folding of the lateral portions 17 takes place simultaneously with the placing of the strip 10 on the tire casing 11, so that the folding on the lines 23 and 24 progresses simultaneously with the placing of the strip 10, and is completed when the overlap 16 is reached.

The enclosing envelope now has the appearance shown in Fig. 3. The next step is the folding inwardly of the shaded portion in the centre of Fig. 3, or the beginning of the formation of the zone 19. The zone 19 is now in engagement with the top of the bead 14, whereupon the zone 20 is folded to a position within the tire casing 11, this operation being facilitated by the presence of the lines of fold 25. When within the tire casing 11 the edge portion of the zone 20 of the strip 10 expands to practically its original size and thus acts as a means for locking the strip 10 in enveloping position on the tire casing 11, holding the same firmly in position.

The folding, creasing and infolding of the strip 10 may be done manually or by mechanical means. It is contemplated that such operations will be performed by machinery, but the method is not limited to such machinery, nor is the product limited to one capable of machine use only. The method of folding and pleating to obtain an enveloping wrapper according to my invention may be varied to suit different tastes or requirements. One method of folding a pleating is described above in connection with the appropriate figures of the drawings. In Figs. 7, 8, and 9, I have illustrated another method of practising my invention. Referring to such Figs. 7, 8, and 9, wherein Fig. 7 shows a strip 30 completely enveloping a tire casing, Fig. 8 a portion of a strip 30, partly in section, and in position on a tire casing, and Fig. 9 a developed view of a portion of a strip 30 of wrapping material, it will be noted that the appearance of the strip 30 in tire casing enclosing condition is distinctly different from the similar condition of the strip 10 in Fig. 1 for example.

The strip 30 of wrapping material is provided with a medial longitudinal zone 31 and lateral portions 32, as in the strip 10. The lateral portions 17 are divided into three zones 33, 34 and 35. The lateral portions 32 are defined by parallelly arranged dash lines 36. The lateral portions 32 are also provided with parallelly spaced dash lines 37 perpendicular to the length of the strip 30, and with pairs of dash lines 38 and 39 extending from the inner ends of pairs of dash lines 37 to a point at the outer edge of the strip 30 midway of the outer ends of such dash lines 37. The dash lines 38 and 39 are arranged at an angle to the length of the strip 30. Further, the dash lines 38 are parallel to each other, and the dash lines 39 are parallel to each other. In addition to the above, the strip 30 is provided with dash lines 40 extending from a point intermediate the ends of the dash lines 38 and 39 to the outer ends of such lines.

As in the showing in Fig. 6, the dash lines in Fig. 9 may be actually impressed on or in the strip 30. Preferably however, no lines of any character are on the strip 30, such lines as have been described being made in the strip preferably during the operation of folding, pleating or creasing the material to conform the same to a tire casing. Such lines as have been described therefore designate the lines of folding or pleating.

The dash lines 37 designate outside folds or pleats; the lines 38 and 29 inside folds or pleats; and the lines 40 expansion folds or pleats.

Preferably, as the strip 30 is being applied to the tread 12 of the tire casing 11, the outside folds or pleats 37 and the inside folds or pleats 38 and 39 are formed to thereby conform the lateral portions 32 to the side walls 13 of the tire casing 11. Subsequently the zone 33 is brought into engagement with the face of the bead 14 of the tire casing 11, after which the zone 35 is infolded to a position within the tire casing 11.

The result is as shown in Fig. 7, where the space between pairs of dash lines 38 extend radially, or substantially radially, of the tire casing 11. The inherent stiffness of the material of which the strip 30 is composed, combined with the fact that the zone 35 expands on the dash lines 40 when the zone 35 is infolded or tucked within the tire casing 11, holds the enveloping wrapper in position against accidental displacement or removal.

In Fig. 10 I have shown in section a tire casing 11 in the interior of which is placed a tube 41 and a tube protecting strip 42, such elements being retained in position and protected against damage by the infolded or tucked portions 20 of the wrapping material.

My improved wrapper may be made initially of a closed band of suitable perimeter and width, and with the folds or pleats physically formed in the material thereof. Both the perimeter and width of the closed band will naturally vary in accordance with the outer diameter and size of the toroidal article to be wrapped, and such band may or may not have the folds or pleats physically formed in the material thereof prior to the application of the band to a tire casing.

In the form of a band, my improved wrapper is particularly adapted for manual application to a tire casing, and as such, is within the scope of my invention.

The method of feeding the strip of material relative to and applying the same to the tire casing, or other toroidal object may be carried out as preferred. For example, the strip material may be fed from a roll to the tire casing or other toroidal object and passed about the same, or the tire casing or other toroidal object may be rotated relative to the strip material. The manner of folding, i. e. weakening the areas of the strip material may be carried out by forming the folds at the predetermined areas of the strip material in advance of the application of the strip material to and about the tire casing or other toroidal object or the strip material may be brought into position relative to the tire casing or other toroidal object and the folds formed at the predetermined areas progressively as the strip material is applied.

The infolding or tucking-in of the opposite edges of the strip material is effected in any suitable manner.

The steps in the method of applying the strip material to the toroidal object, such as the preweakening of the areas of the fold lines, the application of the strip material about the tread, or outer periphery of the toroidal object, then about side walls thereof, and the tucking-in and final locating of the infolded portions of the strip material may be carried out manually or by means of suitable apparatus.

Objects other than tires and tire casings and of a general toroidal formation, either solid or hollow, are enwrapped in a manner similar to that hereinabove described.

Various other methods of folding the strip 10 and 30 onto a tire casing will readily suggest themselves to those skilled in the art, and I am not to be limited to merely those illustrated and described.

I claim.

1. A wrapper for tires and the like comprising a strip of flexible sheet material equal in length to the perimeter of the article to be wrapped, a medial zone extending along the length thereof being undisturbed and adapted to be placed in engagement with the tread of the tire, and the zones on either side of the medial zone having formed therein folds or pleats extending transversely of the length of the strip and conforming the material of the said zones to the contour of the side walls of the tire, and additional folds or pleats formed in the side zones adjacent the side edges of the strip, and adapted to conform the material of the edge portion of the strip to the surface of the interior of the walls of the tire adjacent to the bead portions thereof.

2. A package comprising a distortable article such as a tire casing, and a wrapping consisting of a strip of smooth, flexible, paper extending circumferentially of the tire casing in engagement with the tread portion thereof, and with the side portions of the strip folded or pleated and brought inwardly into conformity with the contour of the side walls of the tire casing, the edges of the strip being additionally folded and pleated and unfolded around the beads of the tire casing into the interior thereof.

WILLIAM A. RINGLER.